May 18, 1926.

F. M. BUNDREN

FLOUR SIFTER

Filed April 30, 1925

1,585,606

F. M. Bundren
INVENTOR.

BY John M Spellman
ATTORNEYS.

Patented May 18, 1926.

1,585,606

UNITED STATES PATENT OFFICE.

FRANCIS M. BUNDREN, OF EL PASO, TEXAS, ASSIGNOR OF ONE-FOURTH TO H. H. BAILEY AND ONE-FOURTH TO P. H. BAILEY.

FLOUR SIFTER.

Application filed April 30, 1925. Serial No. 26,861.

This invention relates to improvements in flour sifters used in the sifting of flour in making bread and the like, and has for its principal object to provide a simple, practical and inexpensive device of this nature which will reduce all lumps of flour to a finely powdered condition, separate any undesirable foreign matter therefrom and perform this operation easily and quickly.

With these objects in view, the invention will be better understood by reference to the following description, taken in connection with the accompanying drawings, forming part hereof and in which.

Figure 1:
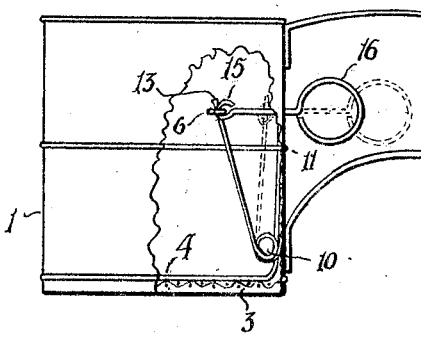
Figure 1 is a side elevational view of a flour sifter embodying the invention, with parts broken away to show the interior arrangement.

Continuing the description of the invention and referring to its various parts more in detail, 1 denotes the body of the sifter with a handle 2, sufficiently large to permit a good grasp of the hand.

Across the bottom of the body is a screen mesh 3, commonly used in devices of this sort.

Within the body 1 of the sifter and disposed across the screen mesh 3 is a loop of wire 4. The loop is first formed in the wire, turned upwardly at an angle to the loop, see Figure 2, to provide a shank 5. This shank portion is then twisted and turned at right angles inwardly to form an eye 6, then the end of the wire 7 is directed upward and pivoted in the side of the body 1 at 8 and the shank is pivoted also at its lower portion 9 adjacent the loop 4. Thus when the loop is in normal inoperative position as indicated by full lines in Figure 2, the eye 6 will lie just within the vertical plane of the loop. The loop, it will be noticed, when in normal position is at one side of the body 1.

Arranged within the body 1 and on a line with the handle 2 is a spring member 10 fastened to the body at the point 11 and directed part way around the inner periphery of the body by a loop 12 to stabilize the spring. The opposite end 13 is passed through the eye 6.

The means for moving the loop or agitator 4 across the wire mesh 3 is a member 14 with eyed extremity 15, this eye being connected with the eye 6. This member 14 has a large ring 16 formed on its outer end.

Figure 2:
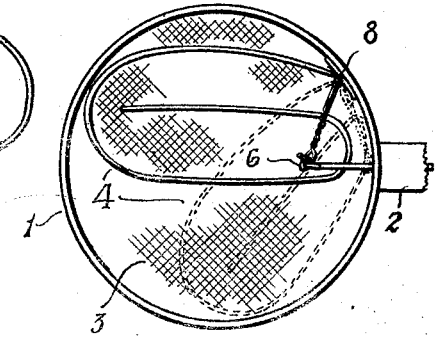
Figure 2 is a top view.
Figure 3:
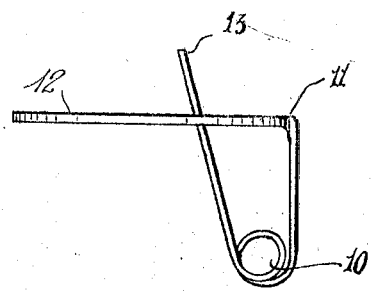
Figures 3, 4 and 5 are enlarged detail views of the movable parts, disassembled for clearer illustration.
Figure 4:
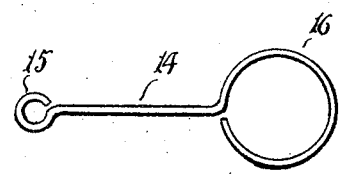
Figure 5:
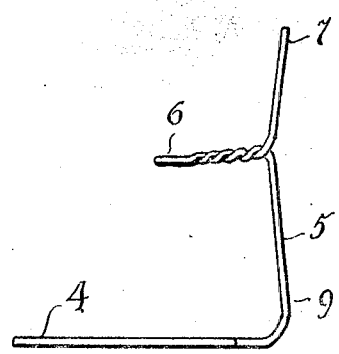
Figure 6:
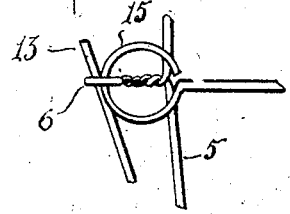
Figure 6 is an enlarged, detail fragmentary view of a portion of the movable parts, showing their connection.

The operation of the device is as follows: the hand grasps the handle 2 and one finger is passed through the ring 16 to simultaneously pull the agitator loop 4 across the wire mesh 3 and contract the spring member 10—shown in dotted lines in Figures 1 and 2. Obviously, releasing the pull on the ring 16 will move the agitator loop to reverse position.

What is claimed is:

A device of the character described comprising in combination a body portion having a handle, a foraminous bottom in said body, an agitator arranged to oscillate horizontally and in contact with said bottom, means to actuate said agitator, a spring member pivoted at a point near the bottom and side of said body and extending upwardly toward the vertical axis thereof, said spring member being in operative attachment to the actuating means whereby movement of said spring will cause agitation of the material to be sifted at a point centrally of the body.

In testimony whereof I have signed my name to this specification.

FRANCIS M. BUNDREN.